US012617676B2

(12) United States Patent
Christensen et al.

(10) Patent No.: US 12,617,676 B2
(45) Date of Patent: May 5, 2026

(54) PROCESS AND PLANT FOR THE PRODUCTION OF SYNTHESIS GAS AND GENERATION OF PROCESS CONDENSATE

(71) Applicant: TOPSOE A/S, Kgs. Lyngby (DK)

(72) Inventors: Steffen Spangsberg Christensen, Køge (DK); Nitesh Bansal, Noida (IN)

(73) Assignee: TOPSOE A/S, Kgs. Lyngby (DK)

( * ) Notice: Subject to any disclaimer, the term of this patent is extended or adjusted under 35 U.S.C. 154(b) by 860 days.

(21) Appl. No.: 17/905,280

(22) PCT Filed: Mar. 17, 2021

(86) PCT No.: PCT/EP2021/056859
§ 371 (c)(1),
(2) Date: Aug. 30, 2022

(87) PCT Pub. No.: WO2021/197854
PCT Pub. Date: Oct. 7, 2021

(65) Prior Publication Data
US 2023/0114501 A1      Apr. 13, 2023

(30) Foreign Application Priority Data

Apr. 1, 2020   (IN)  ............................. 202011014544
May 22, 2020   (EP)  .................................... 20176035

(51) Int. Cl.
*C01B 3/38*          (2006.01)
*C01B 3/382*        (2026.01)
(Continued)

(52) U.S. Cl.
CPC ................ *C01B 3/38* (2013.01); *C01B 3/382* (2013.01); *C01B 3/48* (2013.01); *C01B 3/56* (2013.01);
(Continued)

(58) Field of Classification Search
CPC .. C01B 3/38; C01B 3/382; C01B 3/48; C01B 3/56; C01B 2203/0233; C01B 2203/0244;
(Continued)

(56) References Cited

U.S. PATENT DOCUMENTS 3,367,882 A     2/1968   Marshall, Jr.
3,904,389 A     9/1975   Banquy
(Continued)

FOREIGN PATENT DOCUMENTS

EP        2865641 A1      4/2015
EP        3093268 A1     11/2016
(Continued)

OTHER PUBLICATIONS

U.S. Appl. No. 18/559,352, Per Juul Dahl, filed Nov. 7, 2023,
(Continued)

*Primary Examiner* — Anthony J Zimmer
*Assistant Examiner* — Abdul-Rahman Yusuf Waleed Smari
(74) *Attorney, Agent, or Firm* — Boone IP Law

(57)          ABSTRACT
Process and plant for producing a synthesis gas by catalytic steam reforming of a hydrocarbon feedstock in a steam reforming unit, wherein water is removed from the synthesis gas as a process condensate, wherein boiler feed water is introduced in the process, and wherein said process or plant produces at least two separate steam streams: a pure steam which is generated from at least a portion of said boiler feed water by the cooling of synthesis gas, and a process steam which is generated by evaporating at least a portion of the process condensate by using synthesis gas, optionally together with pure steam and/or flue gas from the steam reforming unit.

13 Claims, 2 Drawing Sheets

(51) Int. Cl.
    *C01B 3/48*        (2006.01)
    *C01B 3/56*        (2006.01)

(52) U.S. Cl.
    CPC ................. *C01B 2203/0233* (2013.01); *C01B 2203/0244* (2013.01); *C01B 2203/0294* (2013.01); *C01B 2203/043* (2013.01); *C01B 2203/0495* (2013.01); *C01B 2203/0883* (2013.01); *C01B 2203/0894* (2013.01); *C01B 2203/1235* (2013.01); *C01B 2203/1241* (2013.01); *C01B 2203/142* (2013.01)

(58) Field of Classification Search
    CPC ...... C01B 2203/0294; C01B 2203/043; C01B 2203/0495; C01B 2203/0883; C01B 2203/0894; C01B 2203/1235; C01B 2203/1241; C01B 2203/142; C01B 3/50; C01B 2203/0288
    See application file for complete search history.

(56) References Cited

U.S. PATENT DOCUMENTS

| | | | |
|---|---|---|---|
| 5,441,990 | A | 8/1995 | Robin et al. |
| 9,556,026 | B1 | 1/2017 | Davis et al. |
| 10,919,761 | B2 | 2/2021 | Lehmann et al. |
| 2005/0288381 | A1 | 12/2005 | Marrella et al. |
| 2013/0213489 | A1 | 8/2013 | Von et al. |
| 2019/0112189 | A1 | 4/2019 | Tadiello et al. |
| 2021/0033275 | A1 | 2/2021 | Peng |
| 2021/0101797 | A1 | 4/2021 | Tadiello et al. |

FOREIGN PATENT DOCUMENTS

| | | | |
|---|---|---|---|
| EP | 3138810 | A1 | 3/2017 |
| EP | 3235784 | A1 | 10/2017 |
| EP | 3235785 | A1 | 10/2017 |
| EP | 3792217 | A1 | 3/2021 |
| GB | 2006814 | A | 5/1979 |
| WO | 2018/162576 | A1 | 9/2018 |
| WO | 2019/228797 | A1 | 12/2019 |

OTHER PUBLICATIONS

European Search Report issued in corresponding Patent Application No. 20 17 6035 dated Oct. 26, 2020.

International Search Report (PCT/ISA/210) and Written Opinion (PCT/ISA/237) mailed on May 18, 2021, by the European Patent Office as the International Searching Authority for International Application No. PCT/EP2021/056859.

Dybkjaer, et al. "Tubular reforming and autothermal reforming of natural gas—an overview of available processes" Elsevier, Fuel Processing Technology, vol. 42, 1995, pp. 85-107.

Danish Search Report mailed on Nov. 25, 2021, by the Danish Patent and Trademark Office for Danish Application No. PA202100545.

Intention to grant received for European Application No. 21711596.3, mailed on Aug. 8, 2023, 6 pages.

International Preliminary Report on Patentability received for PCT Patent Application No. PCT/EP2021/056859, mailed on Oct. 13, 2022, 8 pages.

International Search Report and Written Opinion received for PCT Patent Application No. PCT/EP22/063905, mailed on Sep. 14, 2022, 9 pages.

PROCESS AND PLANT FOR THE PRODUCTION OF SYNTHESIS GAS AND GENERATION OF PROCESS CONDENSATE

FIELD OF THE INVENTION

The present invention relates to a process and plant for producing a synthesis gas and/or a hydrogen product under the production of process steam originating from process condensate formed during the process, and which may be consumed internally in the process or plant, and pure steam as export steam which is generated from boiler feed water by the cooling of synthesis gas.

BACKGROUND OF THE INVENTION

In processes and plants for producing of synthesis gas (syngas), i.e. a gas rich in hydrogen and carbon monoxide, the synthesis gas can be further used in the production of valuable intermediate or end products, for instance hydrogen. The synthesis gas is normally produced by so-called catalytic steam methane reforming and/or autothermal reforming. As a result of steam methane reforming, the synthesis gas (syngas) contains water which typically needs to be removed. The removal of water is normally conducted in a separator under the generation of a process condensate (PC) stream and a water-depleted synthesis gas stream. Also, as part of the process, boiler feed water (BFW) is used to indirectly cool the produced synthesis gas by means of so-called BFW-preheating units.

The BFW is thereby transformed into a saturated steam, also denoted as pure steam. This pure steam is normally free of impurities, i.e. contaminants, generated during the process such as carbon dioxide, methanol, ammonia and acetic acid, and thus this pure steam is suitable for use as export steam, since customers usually demand a high steam quality. On the other hand, such contaminants albeit in small amounts are present in the process condensate, so steam generated from this stream is not suitable for use as export steam.

Normally, process condensate is stripped with steam in a PC-stripper. The stripped process condensate is mixed with BFW and used for steam production and export steam. The stripped process condensate still contains small amounts of impurities which may contaminate the generation of pure steam.

US 2005/0288381 A1 discloses a method of recycling process stream condensate from a steam reforming system. Process steam is generated in a PC-boiler by heat exchange with a portion of pure steam generated in a separate steam production system. The process steam and the other portion of the pure steam are then combined and used to form a hydrocarbon/steam stream as feed for the steam reforming.

EP 3235785 A1 discloses a process in which process condensate is evaporated to form process steam by using a portion of the generated pure steam. For the generation of the pure steam, synthesis gas and flue gas from the steam reforming process is used.

EP 3235784 A1 is similar to EP 3235785 A1 and discloses a process in which process steam is generated by evaporating process condensate using pure steam as the heat exchanging medium.

GB 2006814 A discloses a process in which process steam is generated by a process condensate passing to circulation heating unit using pure steam as heat exchanging medium.

U.S. Pat. No. 9556026 discloses a process in which process steam is generated by heat exchange with synthesis gas of a water condensate in serially arranged heat exchanger units, and subsequently passing the thus pre-heated water condensate to a steam drum to make the process steam using flue gas from a steam methane reformer as heat exchanging medium.

The prior art does not disclose combining in a single step the use of synthesis gas formed by steam reforming optionally together with pure steam and/or flue gas from steam reforming, for evaporating the process condensate.

SUMMARY OF THE INVENTION

It is an object of the present invention to avoid contamination of a pure steam generated from boiler feed water with impurities from a process condensate stream formed during the process.

It is another object of the present invention to provide a simpler and more flexible process and plant for generation of pure steam and process steam.

These and other objects are solved by the present invention.

Accordingly, in a first aspect the invention is a process for producing a synthesis gas by catalytic steam reforming of a hydrocarbon feedstock in a steam reforming unit, said reforming unit optionally generating a flue gas, wherein water is removed from the synthesis gas as a process condensate, wherein boiler feed water is introduced in the process, and wherein said process produces at least two separate steam streams: i) a pure steam stream which is generated from at least a portion of said boiler feed water (BFW) by the cooling of synthesis gas, and ii) a process steam stream which is generated by evaporating at least a portion of the process condensate by the cooling of synthesis gas; and wherein step ii) is conducted in a process condensate boiler (PC-boiler).

In an embodiment according to the first aspect of the invention, step ii) also comprises the cooling of at least a portion of said pure steam stream, and/or the cooling of said flue gas.

It would be understood that the cooling of synthesis gas comprises the cooling of a portion of the synthesis gas. It would also be understood that the cooling of said flue gas comprises the cooling of a portion of said flue gas.

Hence, the invention provides two separate process lines or systems, one for the generation of pure steam suitable for use as export steam, and a separate one for the generation of process steam in which for instance pure steam is used. Preferably, the pure steam and the process steam are not combined.

The process steam may be generated by the use of pure steam and synthesis gas, or for instance also by the use of synthesis gas, pure steam and flue gas, or for instance also by the use of synthesis gas and flue gas, as heat exchange medium/media for the evaporation of the process condensate and thereby production of the process steam.

The invention enables the generation of the process steam in a single step i.e. step ii).

Step ii) is conducted in a process condensate boiler (PC-boiler), preferably having arranged therein one or more heat exchanger units for the cooling of synthesis gas, pure steam and/or flue gas. Accordingly, a single PC-boiler is utilized which combines therein the cooling of synthesis gas, together with the cooling pure steam and/or the flue gas. This a simpler and much more efficient approach than for instance using separate units for providing heat or evaporating process condensate using synthesis gas, and further downstream using additional unit(s) for finally evaporating the process condensate and thereby generating the process steam.

The use of the pure steam or flue gas, and synthesis gas is preferably by indirect heat exchange i.e. no direct contact such as mixing, with the process condensate.

In particular, by combining the use of pure steam and synthesis gas in the generation of process steam, i.e. in a single PC-boiler, a more efficient use of the PC boiler is achieved, as both the pure steam and the synthesis gas may be used as heat exchange media with the PC-boiler. A smaller PC-boiler size is thereby also achieved.

The PC-boiler is dedicated to generating process steam from the process condensate stream and represents a more simple and inexpensive solution than the use of a typical process condensate stripper. Preferably also, the cooling of synthesis gas for the generation of the process steam is conducted by the synthesis gas being led directly into said PC-boiler. The term "led directly" means that there are no intermediate steps in which the synthesis gas is cooled or otherwise treated prior to entering the PC-boiler.

In an embodiment according to the first aspect of the invention, the steam reforming unit is a conventional steam methane reformer (SMR), e.g. a tubular reformer.

In an embodiment according to the first aspect of the invention, the steam reforming unit is an autothermal reforming (ATR) unit, or a combination of a conventional steam methane reformer (SMR), e.g. a tubular reformer, and an ATR unit, from which a raw synthesis gas is produced, and said synthesis gas is a process gas produced by passing said raw synthesis gas through a catalytic water-gas shift (WGS) conversion stage comprising the use of one or more water-gas shift conversion units.

Use of steam reforming unit being a combination of a conventional steam methane reformer (SMR), e.g. a tubular reformer, and an ATR unit, is particularly suitable for production of hydrogen in large scale.

It may also be advantageous to operate the process in which the steam reforming unit is an ATR unit, since contrary to the SMR, the ATR does not generate flue gas. In addition, the ATR enables operation with much lower steam to carbon molar ratios, thereby carrying less water in the process and thus reducing among other things downstream equipment size.

For more information on these reformers, details are herein provided by direct reference to Applicant's patents and/or literature. For instance, for tubular and autothermal reforming an overview is presented in "Tubular reforming and autothermal reforming of natural gas—an overview of available processes", Ib Dybkjaer, Fuel Processing Technology 42 (1995) 85-107.

In a particular embodiment, said one or more water-gas shift conversion units comprises using a first shift conversion unit such as a high or medium-temperature shift conversion unit (HT or MT-shift unit) and subsequently a second shift conversion unit such as a medium or low temperature shift conversion unit (MT or LT-shift unit), and optionally a third shift conversion unit such as a low temperature shift conversion unit (LT-shift unit), and wherein said cooling of the synthesis gas in step ii) is the cooling of a synthesis gas stream exiting said first or second shift conversion unit, e.g. said HT or MT-shift unit. For catalytic steam reforming where the steam reforming unit is ATR, the shift conversion is preferably a HT-shift unit followed by MT or LT-shift unit. For catalytic steam reforming where the steam reforming unit is a conventional SMR, the shift conversion is preferably a MT-shift.

Water gas shift enables the enrichment of the synthesis gas in hydrogen, as is well-known in the art. The temperature of the synthesis gas exiting the first shift conversion unit, e.g. the MT-shift unit is in the range 330-350° C., while the synthesis gas exiting the subsequent second shift conversion unit is in the range 200-250° C., hence the former is more suitable for use as heat exchanging medium for evaporating the process condensate. In particular for ATR, the exit temperature from HT shift is 430-460° C. and the exit temperature from downstream MT shift is 320-340° C. Here the PC boiler can be placed downstream both HT and MT shift converter.

In an embodiment according to the first aspect of the invention, the process condensate is preheated, preferably by indirect heat exchange, with:
- pure steam used in said step ii), or a condensate thereof; and/or
- a portion of synthesis gas withdrawn after said WGS conversion stage, preferably after the second or third shift conversion unit, and preferably also before further cooling of the synthesis gas in one or more heat exchangers, i.e. BFW-preheating units, used for the generation of the pure steam stream.

Thus, a synthesis gas stream from preferably the second (and last) shift conversion unit (LT-shift) is divided into a synthesis gas stream from which water is removed for generating said process condensate stream, and a by-pass stream which is dedicated to preheating the process condensate, preferably by indirect heat exchange e.g. in a process condensate preheater. The thus preheated process condensate is then passed through said PC-boiler for generating the process steam. This embodiment is particularly suitable where conducting step ii) in which process steam is generated by the cooling of synthesis gas and pure steam.

These embodiments offer the advantage of in a simple and efficient manner to reduce the heat duty of the PC-boiler, thereby reducing its size.

In an embodiment according to the first aspect of the invention, a portion of the pure steam stream is used as export steam. Hence, a portion of the pure steam is used for the generation of process steam, while another portion is used for export as this is not contaminated.

In an embodiment according to the first aspect of the invention, the process steam stream is mixed with the hydrocarbon feedstock prior to entering the steam reforming unit. Preferably, the process steam is not combined with pure steam upon mixing with the hydrocarbon feedstock. Thereby, there is more pure steam available for export.

In an embodiment according to the first aspect of the invention, the synthesis gas is converted into a hydrogen product stream, the process condensate being generated in a process condensate separator, in which the process condensate separator also generates a water-depleted synthesis gas stream of which at least a portion is passed through a hydrogen purification stage, preferably in a Pressure Swing Adsorption unit (PSA unit), under the formation of said hydrogen product stream and an off-gas stream.

In an embodiment according to the first aspect of the invention, the pure steam stream after being used for generating the process steam stream, preferably in a PC-boiler, is condensed and admixed to the boiler feed water (BFW) introduced in the process. Thereby, a high thermal efficiency of the process/plant is obtained, as the BFW stream is replenished with condensed water from the pure steam stream.

In a second aspect, the invention encompasses also a plant, i.e. process plant, for producing a synthesis gas. Accordingly, there is provided a plant for producing a synthesis gas comprising:

a steam reforming unit for converting a hydrocarbon feedstock into said synthesis gas and optionally generating a flue gas;

a process condensate separator for removing water from said synthesis gas thereby forming a water-depleted syngas stream and a process condensate stream;

a boiler feed water (BFW) system comprising one or more BFW heat exchangers for generating a pure steam stream, by indirect cooling in one or more heat exchangers (BFW preheaters, i.e. BFW preheating units) of said synthesis gas;

a process condensate (PC) system comprising a process condensate boiler (PC boiler) for generating a process steam stream, said PC boiler comprising:

a heat exchange unit for evaporating at least a portion of said process condensate stream by the cooling of synthesis gas; and optionally:

a heat exchange unit for evaporating at least a portion of said process condensate stream by cooling at least a portion of said pure steam stream as heat exchange medium, and/or a heat exchange unit for evaporating at least a portion of said process condensate stream by the cooling of flue gas.

Accordingly, a single PC-boiler is utilized, which uses synthesis gas optionally together with pure steam and/or flue gas, for evaporating process condensate and thereby generate said process steam stream.

In an embodiment according to the second aspect of the invention, said synthesis gas is converted into a hydrogen product, by the plant further comprising: one or more water-gas shift conversion units for enriching said synthesis gas in hydrogen; a hydrogen purification unit, preferably a PSA-unit, for producing said hydrogen product from at least a portion of said water-depleted syngas stream, and an off-gas stream, e.g. a PSA off-gas stream.

The hydrogen product is then provided to end users, while the PSA off-gas may be used to assist in e.g. the steam reforming unit(s) such as fired heaters used therein for producing synthesis gas.

Preferably said indirect cooling of said synthesis gas with said BFW in one or more heat exchangers, i.e. BFW preheating units, is conducted upstream and/or downstream said one or more shift water-gas shift conversion units.

In an embodiment according to the second aspect of the invention, the steam reforming unit is an autothermal reforming unit (ATR unit), or a combination of a conventional steam methane reformer (SMR), e.g. a tubular reformer, and an ATR unit. This combination in particular is found to be suitable for production of hydrogen in large scale.

In an embodiment according to the second aspect of the invention, the plant further comprises:

process condensate pressure means such as pump for leading said process condensate stream to said process condensate boiler;

a condensate pot and/or condensate drum for collecting a condensate product from said pure steam stream used during the generation of said process steam stream (by using a portion of said pure steam stream exiting the PC-boiler), and optionally pressurizing means such as a pump for transporting and mixing said condensate product (condensed pure steam) with BFW introduced in the plant, i.e. BFW import.

In an embodiment according to the second aspect of the invention, the plant further comprises:

a heat exchanger for indirect heating of the process condensate upstream said process condensate boiler, said indirect heating preferably being with a portion of the synthesis gas withdrawn downstream said one or more water-gas shift conversion units, the plant preferably also comprising means for dividing said portion of the synthesis gas.

Any of the embodiments of the first aspect of the invention may be used with the second aspect of the invention, and vice versa. It would be understood, that any of the associated benefits of the embodiments of the first aspect of the invention may be used with the second aspect of the invention, and vice versa

DETAILED DESCRIPTION

Figure 1:
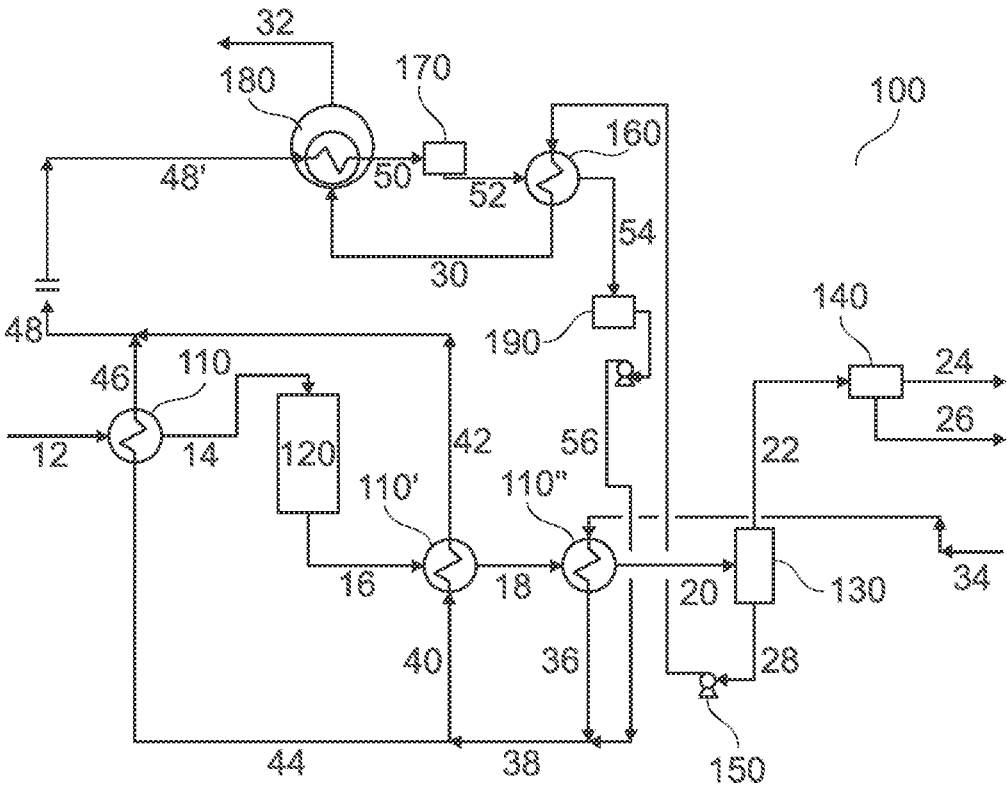
FIG. 1 shows a process plant layout where only pure steam is used for the generation of process steam in a PC boiler. The generated process steam without being mixed with pure steam, is added to the hydrocarbon feedstock for the steam reforming.

With reference to FIG. 1, a process plant 100 is shown, where a hydrocarbon feedstock (not shown) is catalytically reformed in a steam reforming unit such as a conventional SMR unit (not shown) for producing a raw synthesis gas 12 which passes through a first boiler feed water (BFW) preheater (heat exchanging unit) 110, thereby generating a preheated synthesis gas stream 14 that is passed through a catalytic shift conversion stage comprising in this layout one medium shift conversion unit 120. From this shift conversion unit, a synthesis gas stream 16 enriched in hydrogen is produced which is then cooled in a second BFW preheater 110', thus creating cooled synthesis gas stream 18, which is further cooled in third BFW preheater 110", thus generating a cooled synthesis gas stream 20. Water from the synthesis gas 20 is removed in process condensate (PC) separator 130. The process condensate is separated as stream 28, while the water depleted synthesis gas stream is withdrawn as stream 22 and subsequently passed through a hydrogen purification unit, such as a PSA-unit 140, under the formation of a hydrogen product 24 and PSA-off gas 26.

Boiler feed water (BFW) is introduced in the process/plant as BFW import stream 34 and is then used as heat exchanging medium in the third BFW preheater 110", thus forming a first preheated BFW stream 36. This stream may be combined with condensate stream 56 (see description farther below) to form preheated BFW stream 38. Part of this preheated BFW stream 38 is then used as stream 40 in second BFW preheater 110' and as stream 44 in first BFW preheater 110, thus generating preheated BFW streams 42, 46 which are then combined in BFW stream 48.

BFW stream 48 (saturated steam) is then used as pure steam stream 48' and as heat exchanging medium in a PC boiler 180. In the PC boiler 180, process steam 32 is generated by evaporation of the process condensate stream 28, which is pressurized by pump 150 and first preheated in preheater (heat exchanging unit) 160 to form a preheated process condensate stream 30. The preheater 160 uses a condensate 52 of the pure steam 48',50 which was used in the PC boiler 180, as heat exchanging medium. The condensate stream 52 is withdrawn from condensate pot 170. From condensate collector (drum) 190 the above-mentioned condensate 56 (generated from the pure steam) is pressurized and mixed with BFW stream 36.

The process/plant thus shows two separate systems: a BFW system comprising BFW heat exchangers (110, 110', 110") for generating a pure steam stream 48, 48' from BFW 34 introduced in the process/plant, and a PC system comprising PC boiler 180 for generating a separate process steam stream 32, by evaporating process condensate 28 obtained from the synthesis gas. The PC boiler 180 uses the pure steam stream 48' as heat exchange medium therein. The process steam 32, without being mixed with pure steam, is then suitably added to the hydrocarbon feedstock, e.g. natural gas, used in the steam reforming unit, e.g. conventional SMR unit, not shown.

Figure 2:
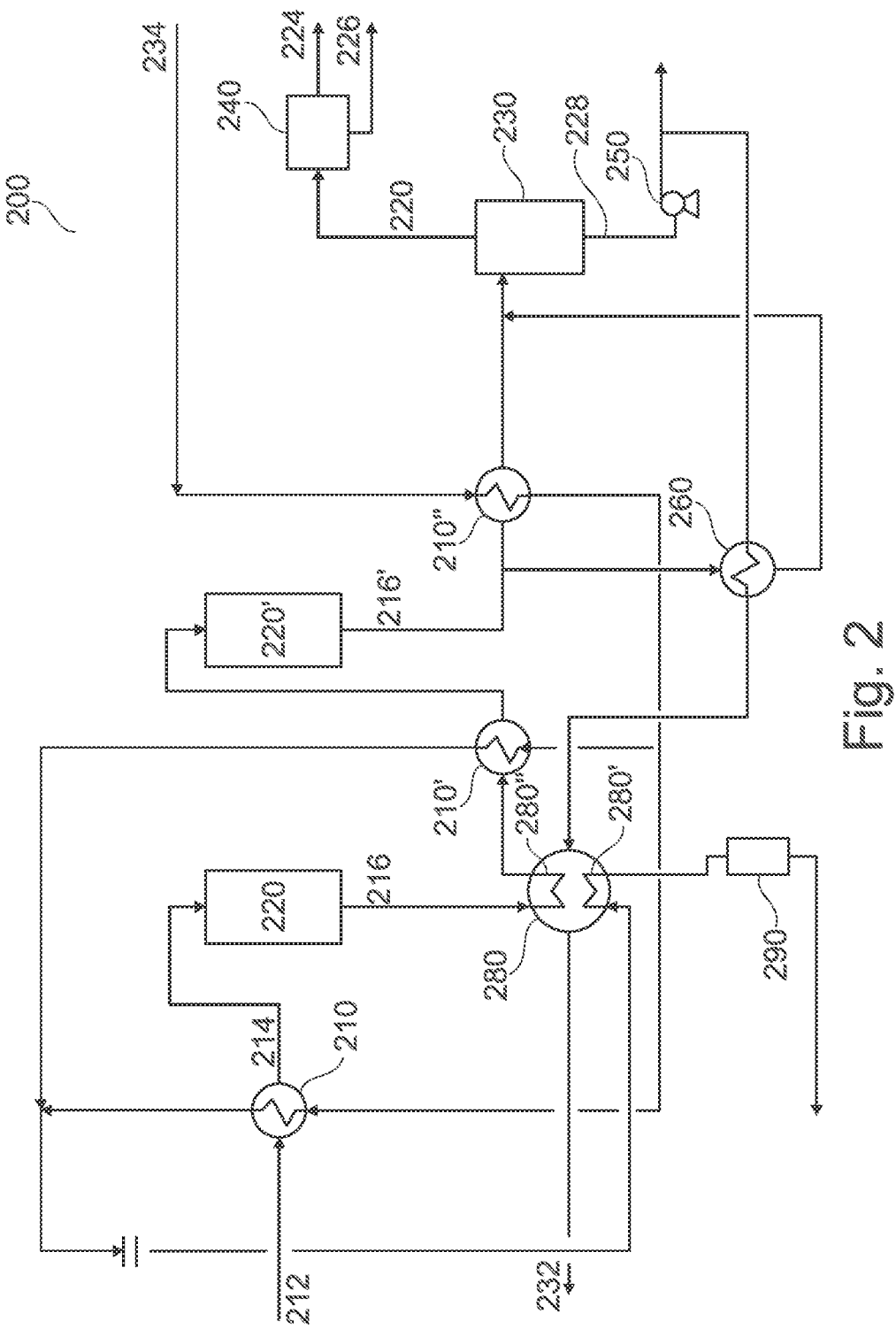
FIG. 2 shows another process layout according to an embodiment of the invention, where pure steam and synthesis gas are used for the generation of process steam in a PC boiler.

Now with reference to FIG. 2, a process plant 200 is shown, in which PC boiler 280 includes: a heat exchange unit 280' for evaporating process condensate stream by using pure steam as heat exchange medium, as well as a separate heat exchange unit 280" for evaporating process condensate by the cooling of synthesis gas.

As in FIG. 1, hydrocarbon feedstock (not shown) is catalytically reformed in a steam reforming unit such as an ATR unit (not shown) for producing a raw synthesis gas 212 which passes through a first boiler feed water (BFW) preheater (heat exchanging unit) 210, thereby generating a preheated synthesis gas stream 214 which is passed through a catalytic shift conversion stage comprising a first unit in the form of a MT-shift unit 220, and second unit in the form of LT-shift unit 220'.

From the first unit 220, a synthesis gas 216 is withdrawn which is then used as heat exchanging medium and thereby cooled in heat exchange unit 280" arranged within PC boiler 280. The cooled synthesis gas is further cooled in preheater 210' before entering the LT-shift unit 220' thereby producing a synthesis gas enriched in hydrogen 216'. Part of this stream 216' is divided and used to preheat, via preheater or heat exchanging unit 260, the process condensate stream 228, which is pressurized by pump 250 to the PC boiler 280.

Another part of the synthesis gas stream 216' is further cooled in BFW preheater 210" using BFW import stream 234 being introduced into the process. The thus further cooled synthesis gas is then combined with the cooled synthesis gas from preheater 260 and passed to PC separator 230. From the PC separator 230 a water depleted synthesis gas stream 220 is withdrawn which is finally passed to hydrogen purification unit 240, such as PSA-unit, under the formation of a hydrogen product stream 224 and PSA off-gas stream 226. The removed water in the PC separator 230 is withdrawn as said PC condensate stream 228, which results after passing through the PC boiler 280 in process steam 232. This process steam 232, without being mixed with pure steam, is then added to the hydrocarbon feedstock used in the steam reforming unit.

The invention claimed is:

1. A process for producing a synthesis gas by catalytic steam reforming of a hydrocarbon feedstock in a steam reforming unit, said steam reforming unit optionally generating a flue gas, wherein water is removed from the synthesis gas as a process condensate, wherein boiler feed water is introduced in the process,
    said process comprising producing at least two separate steam streams:

i) a pure steam stream which is generated from at least a portion of said boiler feed water (BFW) by the cooling of the synthesis gas; and
    ii) a process steam stream which is generated by evaporating at least a portion of the process condensate by the cooling of the synthesis gas,
    wherein the process steam stream is generated in a process condensate boiler (PC-boiler),
    wherein generating the process steam stream also comprises the cooling of at least a portion of said pure steam stream.

2. The process according to claim 1, wherein the steam reforming unit is an autothermal reforming (ATR) unit, or a combination of a conventional steam methane reformer (SMR) and an ATR unit, from which a raw synthesis gas is produced, and
    wherein said synthesis gas is a process gas produced by passing said raw synthesis gas through a catalytic water-gas shift (WGS) conversion stage comprising the use of one or more water-gas shift conversion units.

3. The process according to claim 2, wherein said one or more water-gas shift conversion units comprises using a first shift conversion unit and subsequently a second shift conversion unit and, optionally, a third shift conversion unit, and
    wherein said cooling of the synthesis gas in generating the process steam stream is the cooling of a synthesis gas stream exiting said first or said second shift conversion unit.

4. The process according to claim 2, wherein the process condensate is preheated with:
    pure steam used for generating the process steam stream, or a condensate thereof;
and/or
    a portion of synthesis gas withdrawn after said WGS conversion stage.

5. The process according to claim 1, wherein a portion of the pure steam stream is used as export steam.

6. The process according to claim 1, wherein the process steam stream is mixed with the hydrocarbon feedstock prior to entering the steam reforming unit.

7. The process according to claim 1, wherein the synthesis gas is converted into a hydrogen product stream, the process condensate being generated in a process condensate separator, in which the process condensate separator also generates a water-depleted synthesis gas stream of which at least a portion is passed through a hydrogen purification stage to form the hydrogen product stream and an off-gas stream.

8. The process according to claim 1, wherein the pure steam stream after being used for generating the process steam stream, is condensed and admixed to the boiler feed water (BFW) introduced in the process.

9. The process according to claim 1, wherein the steam reforming unit is a steam methane reformer (SMR).

10. The process according to claim 9, wherein the steam methane reformer (SMR) is a tubular reformer.

11. The process according to claim 9, wherein a raw synthesis gas is produced from the steam methane reformer (SMR),
    wherein said synthesis gas is a process gas produced by passing said raw synthesis gas through a catalytic water-gas shift (WGS) conversion stage comprising the use of one or more water-gas shift conversion units.

12. The process according to claim 11, wherein said one or more water-gas shift conversion units comprises using a first shift conversion unit and subsequently a second shift conversion unit and, optionally, a third shift conversion unit, and wherein said cooling of the synthesis gas in generating the process steam stream is the cooling of a synthesis gas stream exiting said first or said second shift conversion unit.

13. The process according to claim 11, wherein the process condensate is preheated with:

pure steam used for generating the process steam stream, or a condensate thereof;

and/or a portion of synthesis gas withdrawn after said WGS conversion stage.

\* \* \* \* \*